Feb. 28, 1939. T. J. CARSKI ET AL 2,148,899

PIPETTING MACHINE

Filed Jan. 20, 1938

INVENTORS.
T. J. Carski & J. H. Brewer.
BY
*[signature]* their
ATTORNEY

Patented Feb. 28, 1939

2,148,899

UNITED STATES PATENT OFFICE 2,148,899

PIPETTING MACHINE

Theodore J. Carski and John Hanna Brewer, Baltimore, Md.

Application January 20, 1938, Serial No. 185,832

5 Claims. (Cl. 221—102)

This invention refers to liquid measuring machines and more particularly to dispensing and pipetting devices that can suitably deliver liquids and fluids in predetermined quantities. It has among its objects to provide a machine or mechanical device that will take the place of the usual pipette or burette manually used to measure and dispense liquids or fill ampules in laboratories. A further object is to have the dispensing done automatically, accurately and adjustably, in a mechanically operated device that is portable and convenient to use. Another object is to have the functioning of the dispensing and measuring of the liquids visually apparent to the operator, at all times, and the construction adaptable for facile inspection, cleaning, lubrication, and substitution or repair. Other objects, are to have the device free from intricate or complicated mechanism and parts, and such parts as are utilized, easily accessible. A still further object is to have an arrangement whereby the operating parts for dispensing, including the valves, may be easily and quickly detached in a complete unit and sterilized before or after use; and also connections that will permit the insertion of conventional equipment of variable quanta, in place of the existing dispensing unit. Another object is to have the device capable of dispensing minute quantities of measured liquid, such as .05 cc., etc. Other objects will become more apparent as the invention is set forth.

The use of conventional pipettes or burettes for collecting desired amounts of selected liquids and dispensing same in the conventional manner involves the use of open unsterilized parts and containers and contact with the hands of the operators. This increases the liability of introduction of foreign substances, dust and germs into the liquids handled, to a considerable degree rendering the method dangerous and uncertain. In addition the manual use of pipettes or burettes depends on the visual accuracy of the operator and his personal carefulness and patience, as well as physical capacity. He may lose track of his counting and dispense more or less than he intends: he may lay the unsterilized glass, or pipette in a quantity of further contaminating substances which can enter into the liquids being dispensed: he may read the calibrations on the pipette tube or burette inaccurately as he dispenses the quantities because of the necessity of holding perfectly level and straight in his line of sight, this difficulty in doing same continuously and similarly is practically insurmountable. In this invention, the device uses a glass dispenser that contains the liquid fully protected from vitiation and evaporation, and capable of being visually watched and checked: the glass dispenser (pump) with valve attached may be easily removed from the machine and sterilized in the usual manner and thus prepared to dispense sterilized liquids in a sterile manner. It operates through a pumping device that is very accurately calibrated, and propelled through an adjustable eccentric that can vary the stroke. Its suction draws up the liquid from the original container at predetermined intervals, controlled by a special valve, and through the same valve body dispenses the liquid to the receiver vessel.

These valves avoid the use of springs but act, by means of the forces of gravity and the flow of the liquid, with great precision, requiring the least amount of attention, and having little chance of failure to operate. At the same time the valves prevent any back flow of the liquid into the machine after it has been delivered to the receiver vessel. The mechanism is adjustable throughout and easily accessible. It has features of sterilization and interchangeability. A casing is used to contain the motor and support the pump in a convenient manner and position: and has suitable connections for leading the liquid to and dispensing from the machine. In operation the device is practically noiseless: does its work quantitavely effectively and continues until the amount desired of liquid is dispensed. It requires simply the throwing of a switch to operate or stop, avoiding any manual handling that might be objectional or dangerous.

In the drawing which illustrates an embodiment of this invention:

Similar reference characters refer to similar parts throughout the drawing.

Figure 1:
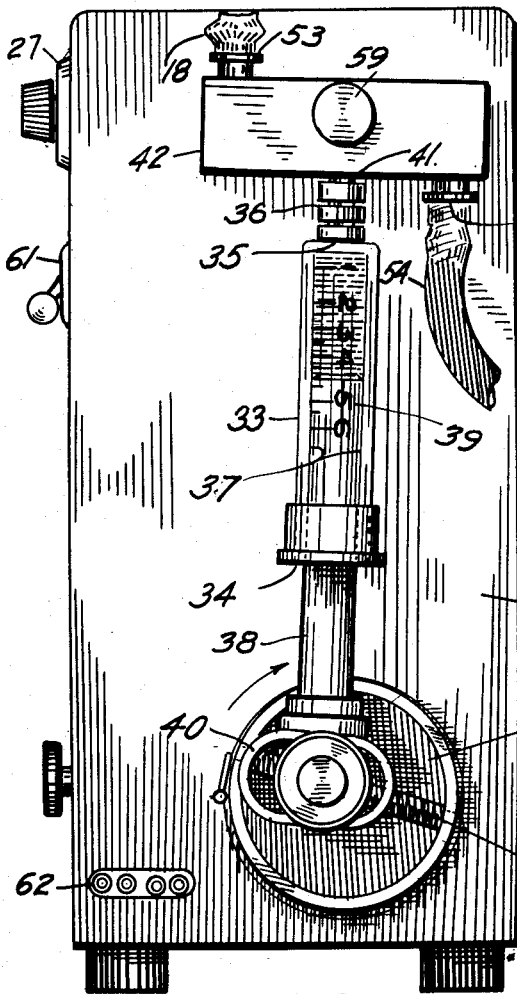
Figure 1 is a side elevation of a mechanical pipette embodying this invention.
Figure 6:
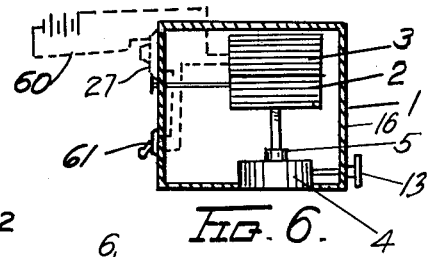
Figure 6 is a sectional view through the casing to indicate the relative position of the parts therein.
Figure 2:
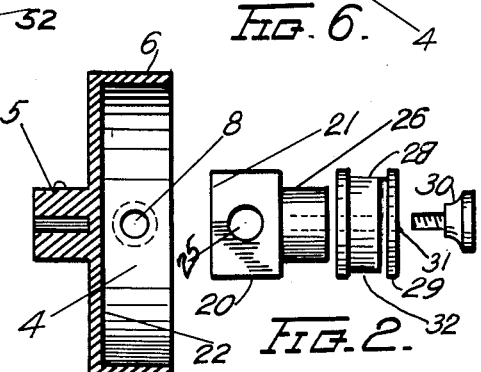
Figure 2 is a sectional view through the control shell used in the device indicated in Figure 1.
Figure 3:
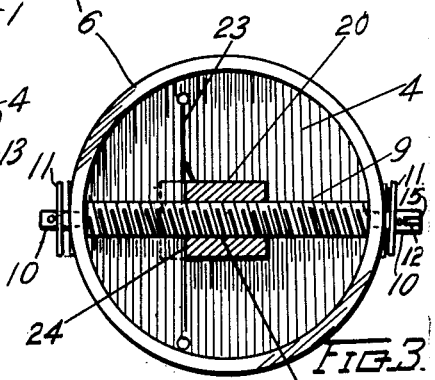
Figure 3 is a detail of the accentric adjustment used for adjusting the travel of the dispensing pump of the device.
Figure 4:
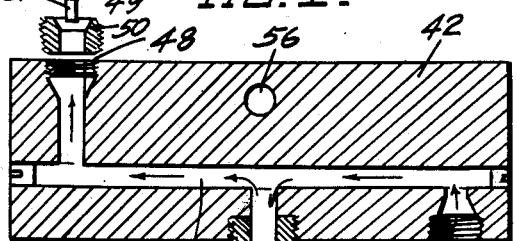
Figure 4 is a detail of the valve arrangement, including the valve block, and the valve elements separated therefrom to show their general construction, in section.
Figure 5:
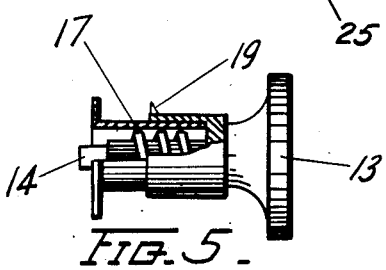
Figure 5 is a sectional detail of the adjustable wrench provided at the side of the casing for engagement with the screw adjustment, as required.

In the drawing, 1 represents the casing or cabinet for holding the parts of the device. It is preferably of boxlike construction, with a door or opening in the back for permitting access to the interior and internal mechanism. A motor 2, for operating the mechanical parts of the instrument, has a speed reducer 3 connected to it, and the latter to a bell-shaped cam shell 4. This is arranged by having the shaft of the speed reducer connect to the clutch boss 5, extending from the back of the shell. The peripheral sides of the shell are shown at 6, extending towards an opening 7 in the front of the casing, and coming flush with the front of the same. These sides are drilled with holes 8, disposed opposite each other, which act as bearings for a screw adjustment 9, which revolves in same. This adjustment screw, has its end portions 10 suitably rounded to revolve in the bearings and with washer locks 11, to keep the screw from loosening therefrom. A key head 12 is provided at one end, to permit the turning of the screw by a knurled nut or knob 13, having an engaging blade 14 provided to engage in the slot 15, in the key head for it. This knurled nut is mounted on the side 16, of the casing, and is extended through same to align with the key head, which it fits into when its blade 14, is pushed into the slot, for the purpose. This is done when an adjustment is made. A spring 17, keeps the knurled nut or knob away from the key normally. A suitable series of markings, in connection with a mark 19, on the knob, serve to indicate a definite known movement to be made for any adjustment desirable.

Screw threadably mounted on the screw adjustment 9, is an eccentric block 20, which is preferably of form indicated in the drawing with back surface 21, making flat contact with the face 22, of the shell so it cannot rotate. This block can reciprocate on the screw adjustment 9, in either direction. The turning of the screw enables it to be moved positively and minutely to suit the adjustment desired.

A line 23, called the zero position, etched across the face 22, and at right angles to the screw adjustment 9, enables the straight edge 24, of the eccentric block to be aligned with it, and accurately locate the block within the shell, for any eccentric movement required of it. The internal screw thread 25, passes through the block as shown and is threaded to suit the screw thread on the screw 9. A neck member 26, extends from the block 20, so as to project a bearing shank beyond the shell and front face of casing. The shank serves as a shaft for a flanged pulley 28, and the latter is kept on with a washer 29, and knurled screw 30, that screws into the threaded hole 31, in the shank. The bearing is lubricated through the oil hole 32, in the pulley.

The dispenser pump used with this device consists of a glass cylinder 33, having an open end 34, full size, and its opposite end portion 35, restricted to a comparatively small mouth end over which a Luer lock attachment 36, may be fastened.

The interior 37, of the cylinder passage is ground to take a ground solid glass plunger 38, and have both fit with each other so closely as to prevent leaks. Calibrations 39, are etched on the cylinder to indicate the quantity of liquid it contains or dispenses. A metal protector is mounted on the open end portion of the cylinder to protect it against injury. The plunger reciprocates in the cylinder and handles the liquid to be dispensed effectively and non-injuriously. It is mounted on an elliptically shaped handle 40, which fits closely on the pulley 28, where it is held on by the washer 29, and screw 30.

The Luer lock is attached to shallow stem 41, which extends from a valve block 42. This valve block is arranged in the passages 43, within it, for the three-way flow of the liquid. The liquid enters at an inlet valve 44, which is controlled by the valve head 45, in the seat 46, the guide piece 47, assisting in guiding it in its movement. This liquid then passes through the passage 43, through the stem 41, into the cylinder 33. It is pumped from the cylinder through the passage 43, to the outlet valve 48, which is controlled by a valve head 49, and having a guide piece 51, in the seat 50.

The valve block is provided with connections 52, and 53, for the inlet and outlet connections, used for securing the pieces of rubber hose 54 and 18 respectively.

The valve block has a bearing hole 56, through which a removable shaft extends and holds it rotatably supported to the front of the casing over the location for the eccentric block. The end portion of the shaft is screw threaded into the casing and a head 59 on it holds the block on.

The motor is energized through an electrical circuit 60, which is controlled by an electric switch 61, mounted on the side of the casing. A metering device 62, serves to keep count of the number of times the dispenser operates and enables the quantity dispensed to be determined. The speed may be regulated by a suitable rheostat 27 mounted exteriorly on one of the sides of the casing, as indicated. A conventional plug and cord provide a suitable electrical connection to the motor and the controls. The outlet valve is preferably detachable and screws into the valve block, being made as shown in the drawing. The inlet valve construction has a similar construction, and screws into the threaded throat, shown.

The operation of the device is as follows: The inlet hose 54, is inserted in a primary container containing the liquid to be dispensed, and the outlet hose 18 into a suitable receiver (not shown). The adjustment nut is pushed in the slot 15, of the adjustment 9, and turned until the eccentric member or block is brought off center in the shell to give the length of stroke determined for the plunger 38, in the cylinder 33.

The switch 61, is then closed and the motor operates turning the speed reducer 3, which in turn rotates the cam shell 4. As the screw adjustment 9, rotates with the shell, the eccentric block rotates with it. The pulley 28, on the eccentric block then gives the cross head handle 40, a movement that induces the plunger 38, to reciprocate in the cylinder, which sways with the valve block on its supporting pin shaft located in the bearing hole 56.

As the plunger moves downwardly, it sucks in liquid from the primary container through the valve 44, and incidentally forces the valve head 49, into its seat 50.

The liquid flows into the cylinder and fills same with the desired amount determined. On the return stroke the plunger forces the liquid through the outlet valve 48, and incidentally closes the inlet valve 44. The process is repeated, until the desired amount of liquid is dispensed, at which time the device is stopped.

When the dispenser is to be used from time to time, it is first disconnected by loosening the screw shaft and the knurled screw 30. The pump unit, consisting of the valve block, hose, hose connections, cylinder, plunger, and handle, is then placed in a sterilization chamber until completely sterilized, after which it may be refastened in place, and provide a sterilized device for doing the pipette or burette functions. The calibrations show the amounts dispensed from the cylinder and the liquid contents can be carefully watched at all times. As the plunger makes each stroke, it operates the lever of the indicating device and registers same. The only item that requires manual operation is that of turning the motor, speed changes and shell, until the slot of the screw adjustment is registered with the hole in the casing through which the key head is inserted into it. This registry has to be arranged in order for the screw adjustment to be made in this construction.

While but one form of the invention has been shown in the drawing, it is not desired to limit this application for patent to this particular construction, otherwise than limited by the prior art, in any way, as it is appreciated that other constructions might be used, that would embody the same principles and come within the scope of the appended claims.

What is claimed is:—

1. A pipetting machine of the class described, comprising in combination, a dispenser of the plunger and reciprocating type with an exteriorly moving actuating member, a valve block having a plurality of gravity operating valves to control the flow of liquid therethrough, a supporting structure for holding the parts of the machine in relation to each other, a shaft for centrally supporting the valve block to the structure in an oscillatable manner, an eccentric member supported directly by the said structure and adjustably connected with the exteriorly actuating member and adapted to reciprocate the plunger and oscillate the member with the valve block attached thereto, means for supplying liquid to the valve block and dispensing therefrom through the valves of the same, means for adjusting the eccentric member from the said structure in a predetermined manner, and means for positioning the eccentric member adjustably in the said structure, and motive means directly connected with the eccentric member for rotating the same.

2. In a pipetting machine, a dispenser unit comprising in combination, a valve block having a central passage therethrough and branch valve passages connected therewith, plugs for permitting access to the central passage for the inspection and cleaning thereof, removable and adjustable valve structures for the valve block and to control the flow of liquid through said passages, a member for loosely securing the valve block to the machine, a dispenser for pump liquids, a Luer lock for securing the dispenser to the valve block, an eccentric member secured to the dispenser for operating the same in a reciprocating manner, said eccentric member being disconnectable from the machine to permit said parts to be removed as a unit.

3. In a pipette machine of the class described, the combination of a valve block structure having recesses for valves and connecting passages thereto, inlet and outlet valve structures in said recesses for checking and unchecking the flow of fluid therethrough, means moveably attaching the block structure to the machine, a cylinder and plunger unit attached to the said block structure and connected with the passages thereof, an eccentric member secured to the plunger portion of said unit and adapted to reciprocate the plunger and oscillate the unit and block aforesaid, means directly connected with the said eccentric member for turning same and for supporting it on the machine, and means for controlling the throw of the eccentric adjustably and the amount of liquid delivered per stroke of the piston.

4. In a pipetting machine of the class described, the combination of a valve block structure having recesses for valves and connecting passages thereto, inlet and outlet valve port structures actuating in said recesses for checking and unchecking the flow of liquid therethrough, a journal member for attaching the block structure to the said machine, said member permitting the block to move oscillatably thereon, a cylinder and plunger unit rigidly and adjustably attached to the said block structure and connected with the passages and valve ports therein, an eccentric member connected with the said unit and adapted to operate the plunger therein and position the cylinder suitably therefor, an adjustable rotatable element for changing the throw of the eccentric predeterminedly, said eccentric member and rotatable element being mounted on the machine, and means for connecting the source of liquid supply and the dispensing thereof to the valve structure adjacent to the valves thereof.

5. In a pipetting machine of the class described, a valve block structure of rectangular form and with recesses and passages therein for the passage of liquid therethrough and having a plurality of valve port attachments adjustably attached therein for checking and unchecking the flow of liquid therethrough, connections for the inlet and outlet conduction of liquids for the said attachments, a plunger and cylinder unit of transparent material for propelling the liquid for the pipetting machine therethrough and permitting observance of its action therein, an eccentric member adjustably connected to the plunger of said unit for allowing the throw of the eccentric to be varied, and the travel of the plunger to be increased or decreased in a predetermined manner, a shell of cylindrical form adapted to contain the eccentric member and permit the adjustment thereof diametrically across same and support it, a casing for the machine with means for attaching the shell and valve structure block moveably thereto, and means for operating the said shell so as to operate the plunger and cylinder unit to dispense liquid in measured amounts through the machine.

THEO. J. CARSKI.
JOHN H. BREWER.